United States Patent [19]

Chen et al.

[11] Patent Number: 4,970,823
[45] Date of Patent: Nov. 20, 1990

[54] PLANT NURSERY BOTTLE

[75] Inventors: Yuan-Yi Chen, Taipei, Taiwan; Perry Parkhurst, San Mateo, Calif.

[73] Assignee: Erico Industries, Belmont, Calif.

[21] Appl. No.: 392,090

[22] Filed: Aug. 10, 1989

[51] Int. Cl.⁵ .............................................. A01G 29/00
[52] U.S. Cl. ...................... 47/48.5; 239/44; 239/276
[58] Field of Search ............ 47/48.5, 79, 81; 239/37, 43, 44, 276

[56] References Cited

U.S. PATENT DOCUMENTS

| | | | |
|---|---|---|---|
| 2,214,083 | 9/1940 | Lester | 239/276 |
| 2,595,782 | 5/1952 | Epstein | 47/48.5 |
| 3,858,205 | 12/1974 | Rohling | 47/48.5 |
| 4,089,133 | 5/1978 | Duncan | 47/48.5 |
| 4,223,837 | 9/1980 | Gudhiotti | 47/48.5 |
| 4,291,836 | 9/1981 | Hsians | 47/48.5 |

FOREIGN PATENT DOCUMENTS

| | | | |
|---|---|---|---|
| 1151974 | 7/1963 | Fed. Rep. of Germany | 239/37 |
| 3440147 | 5/1986 | Fed. Rep. of Germany | 47/48.5 |
| 1455630 | 9/1966 | France | 47/48.5 |
| 2576177 | 7/1986 | France | 47/81 |
| 2045043 | 10/1929 | United Kingdom | 47/81 |
| 1832983 | 4/1960 | United Kingdom | 47/79 |

*Primary Examiner*—Henry E. Raduazo
*Attorney, Agent, or Firm*—Donald C. Feix

[57] ABSTRACT

A container of the kind used for supplying water and/or nutrients directly into the soil adjacent the plant comprises a bottle for holding the supply of water and a cap structure which encloses one end of the bottle. The cap structure is effective to both support the bottle upright on the soil adjacent the plant and to transfer liquid downwardly from the bottle into the soil. The cap structure includes a spike which extends from an outer, flat surface of the cap so that the spike structure can be inserted into the soil until the outer, flat surface of the cap is engaged with the upper surface of the soil. The spike and the flat surface of the cap thus hold the bottle in a stable, upright position. A wick extends through an opening in the cap. The wick has an inner end immersed in the liquid within the bottle and has an outer end which is inserted into the soil. The inner and outer ends of the wick are preferably cut to a tapered figuration for opening the pore structure of the wick and for permitting, at the outer end of the wick, a controlled transfer of fluid from the wick to the soil by capillary action.

5 Claims, 2 Drawing Sheets

PLANT NURSERY BOTTLE

BACKGROUND OF THE INVENTION

This invention relates to a container of the kind used for supplying water and/or nutrients directly into the soil adjacent a plant over an extended period of time, such as, for example several days.

This invention relates particularly to a container of this kind which is constructed to be positioned near a plant and then to automatically transmit fluid directly downwardly from the bottle into the soil (by means of a wick having one end immersed in the fluid within the bottle and having the other end engaged with the soil for capillary transfer of fluid from the wick into the soil) without requiring further attention from an attendant.

The problem of supplying adequate fluid to a plant, particularly to a potted plant over an extended period of time, (such as, for example, several days) and in a way which does not require the personal attention of an attendant, is a problem which has been recognized for a long time. It is a problem for which various structures and techniques have been developed.

U.S. Pat. No. 4,038,780 issued to Edward C. Bruno on Aug. 2, 1977 provides one example of structures and methods which have been used. This patent shows a spherical flask 10 having an elongated neck 20 closed with a cap 35. One or more openings 45 are formed in the elongated neck 20 so that, when the neck 20 and cap 35 are pushed down into the soil around the roots of a potted plant, water can seep out of the openings 45 below the surface 25 of the soil. One of the apparent disadvantages of the container structure shown in this patent is the need to insert a rather large cap and neck structure fairly deeply into the soil in a way which could press against and which could possibly injure the root structure of the plant.

There are many other structures and techniques which address the problem, and the other structures and techniques have certain advantages and certain disadvantages, depending on the structure and depending upon the intended applications.

It is a primary object of the present invention to construct a plant nursery bottle which is simple in construction and easy to use and yet highly effective to maintain sufficient moisture in the soil to keep the plant in a well cared for condition.

It is a related object to construct a plant nursery bottle which is direct in its installation and mode of operation and which also permits direct and simple adjustment of the automatic rate of transfer of fluid from the container into the soil.

SUMMARY OF THE INVENTION

The present invention is a container of the kind used for supplying water and/or nutrients directly into the soil adjacent a plant. The container is a plant nursery bottle having a bottle portion for holding a supply of fluid to be applied into the soil adjacent the plant and a cap which encloses one end of the bottle. The cap has a spike which extends from an outer, flat face of the cap. The spike is insertable into the soil until the flat face of the cap engages the upper surface of the soil. The length of the spike and the flat surface of the cap provide a stable support for holding the bottle in an inverted position. The fluid is supplied directly downwardly from the interior of the bottle into the soil.

The spike is a relatively slender member having a rounded outer end and a tapered configuration for minimizing any possible damage to the root structure of the plant. The cap has an opening adjacent the spike, and a wick extends through that opening. The wick has an outer end which is insertable into the soil. The wick has an inner end which extends upwardly into the liquid within the interior of the bottle.

In a specific embodiment of the present invention the wick is a polyester fiber bar which has essentially the same structure as the wicks used for marker pens. The wick is stiff enough to permit the outer end of the wick to be pushed into the soil. The wick has an open cell porosity structure of a size which facilitates wicking of the fluid into the soil. The inner and outer ends of the wick are preferably cut or shaved to a tapered configuration to facilitate penetration of the tapered configuration. The tapered configuration on the outer end of the wick facilitates insertion of that end of the wick into the soil, and the tapered configuration also provides an increased surface area for capillary contact of the pores of the wick with the soil for capillary transfer of fluid. The wick, in a specific embodiment of the present invention is square shaped in cross section with each sidewall having a width between ⅛ inch and 3/16 inch.

The cap is threaded onto the neck of the bottle and a washer is engaged between the cap and the neck so that the cap can be adjustably tightened against the washer and the neck of the bottle. This permits regulation of the amount of air which can enter into the interior of the bottle as the fluid is transferred from the bottle to the soil. This in turn permits a regulation of the flow rate of the fluid from the bottle.

Plant nursery bottle apparatus and methods which incorporate the structural features described above and which are effective to provide the functions as described above comprise further, specific objects of the present invention.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

DESCRIPTION OF THE DRAWINGS

In FIG. 1 the plant nursery bottle is shown positioned adjacent a plant for supplying fluid from the nursery bottle into the soil at the roots of the plant.

DETAILED DESCRIPTION OF THE PREFERRED EMBODIMENTS

Figures 1, 2:
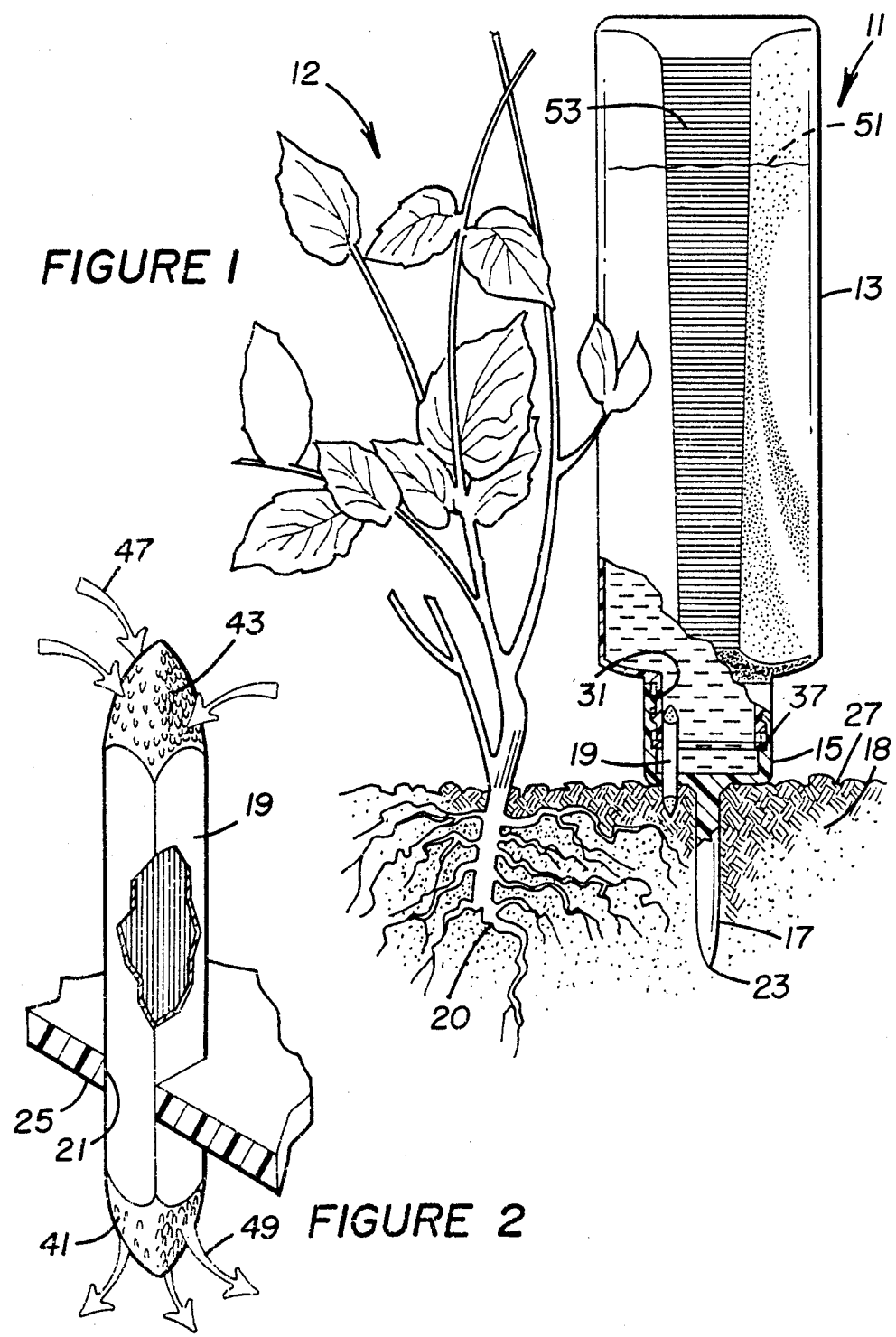
FIG. 1 is a side elevation view, partly broken away and in cross section to show details of construction, of a plant nursery bottle constructed in accordance with one embodiment of the present invention.
FIG. 2 is an enlarged, isometric view, partly broken away and in cross section to show details of construction, of the wick structure incorporated in the plant nursery bottle shown in FIG. 1.

In FIG. 1 a container constructed in accordance with one embodiment of the present invention is indicated generally by the reference numeral 11. The container 11 is a plant nursery bottle and is shown positioned adjacent a plant 12 for supplying water and or nutrients directly into the soil adjacent the roots 20 of the plant.

The plant nursery bottle (when positioned as shown in FIG. 1) automatically supplies fluid to the soil at a rate which maintains sufficient moisture in the soil to keep the plant in a well cared for condition for an extended period of time. Depending upon soil conditions and environmental conditions, a single bottle of twelve oz. capacity may dispense liquid for forty-eight to seventy-two hours.

The plant nursery bottle 11 includes a bottle portion 13 and a cap 15.

A spike 17 is inserted into the soil 18 adjacent the plant 12 to hold the bottle 13 upright in the inverted position shown in FIG. 1.

A wick 19 extends through an opening 21 in the cap 15 and transmits fluid downwardly from the interior of the bottle 13 into the soil 18.

As will be described in greater detail below, the structure and mode of operation of the plant nursery bottle 11 are effective to maintain sufficient moisture in the soil 18 to keep the plant 12 in a well cared for condition.

The tip 23 of the spike 17 is rounded (rather than being formed to a sharp point), and the spike 17 has a tapered, elongated shape for minimizing any possible damage to the root structure 20 of the plant 12.

The spike 17 is preferably formed integrally with the cap 15 and extends outwardly from a flat outer surface 25 of the cap so that the flat surface 25 of the cap can be positioned essentially flush and in engagement with the upper surface 27 of the soil.

The spike 17 has a length which is long enough so that the spike 17 and the flat surface 25 of the cap coact to hold the bottle 13 in a stable, upright position as illustrated in FIG. 1.

Figure 3:
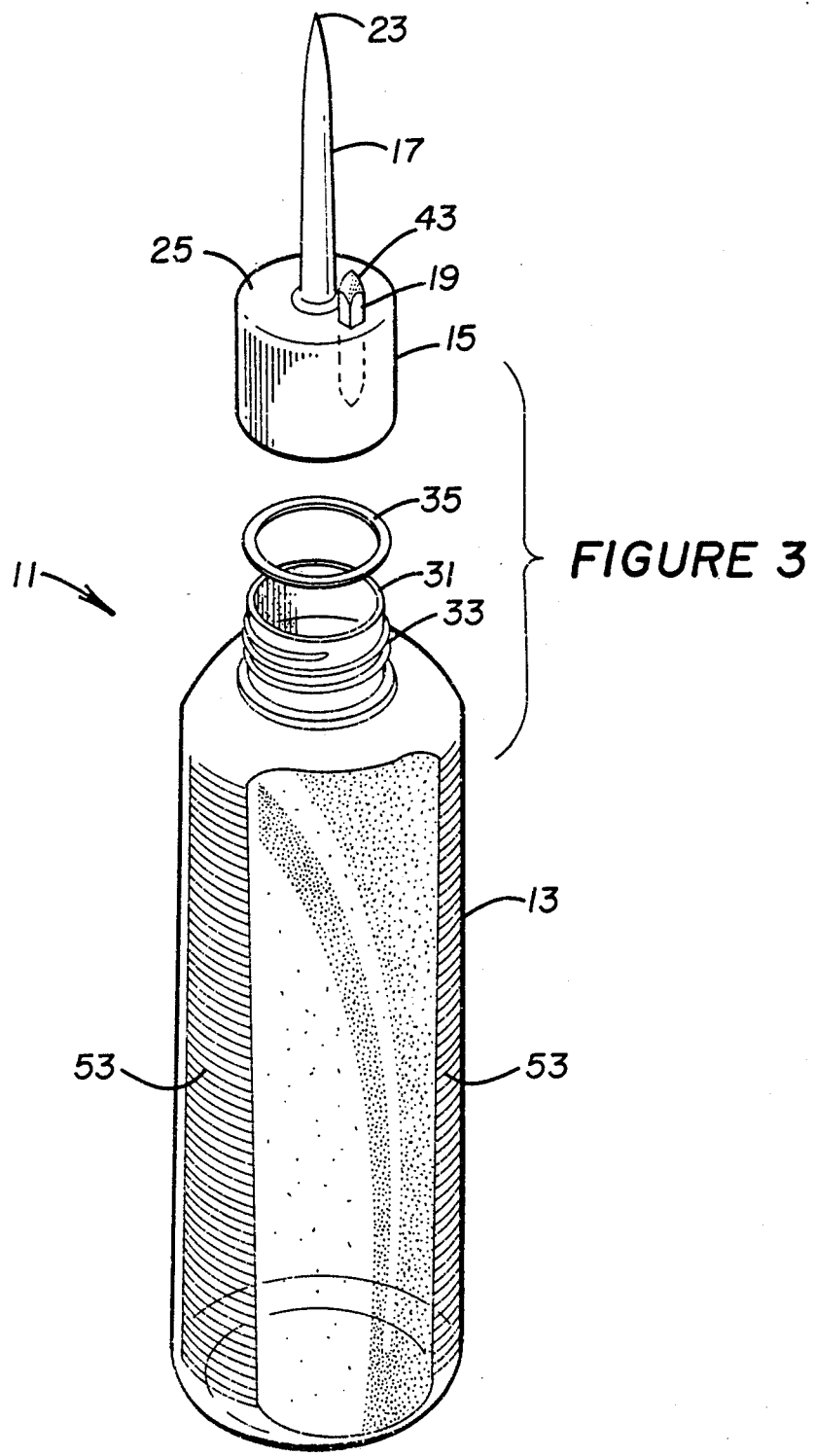
FIG. 3 is an enlarged, exploded, isometric view showing details of the structure and assembly of the plant nursery bottle shown in FIG. 1.

As best shown in FIG. 3, the bottle 13 has a neck 31 with outer threads 33. The cap 15 has internal threads (not visible in FIG. 3) which coact with the threads 33 on the neck 31.

A washer 35 is positioned between the upper end of the neck 33 and a coacting innerface 37 of a counter bore in the cap 15 (see FIG. 1) so that the cap 15 can be adjustably tightened against the washer 35 and the upper edge of the neck 31 to regulate the amount of air which can be permitted to seep into the interior of the bottle 13 as fluid is transferred from the bottle 13 through the wick 19 into the soil 18. Adjusting the tightness of the cap 15 regulates the amount of air which can flow into the interior of the bottle to reduce or to counteract the vacuum condition which is developed by outflow of fluid from the bottle. Adjusting the tightness of the cap thus provides an adjustable control on the rate at which fluid is transferred from the bottle to the soil.

As best shown in FIG. 2, in one specific embodiment of the present invention the wick 19 is a fiber bar structure having an essentially square cross section.

The outer end 41 and the inner end 43 of the wick are preferably tapered as illustrated.

The tapered outer end 41 facilitates entry of the wick 19 into the soil and also facilitates transfer of fluid to the soil by capillary action.

The wick 19 is formed of a material which is stiff enough to permit the outer end portion of the wick 19 (the end portion which projects beyond the flat surface 25 of the cap) to be inserted into the soil. The wick material also has a structure which permits the pore structure (of at least the shaped end 41) to engage the soil for capillary transfer of fluid from the wick into the soil.

In a specific embodiment of the present invention the wick 19 is a polyester fiber bar which has essentially the same structure as the wicks used for marker pens. In this specific embodiment the bar 19 is square shaped in cross section with each side having a width between ⅛ inch and 3/16 inch. The polyester fiber bar is a bar which has been extruded to the specific size which has been and heat treated and which has then been cut in pieces to permit each individual piece to be made into a wick like the wick 19 shown in FIG. 2.

The size of the pores in the wick as well as the cross sectional area of the wick affects the amount of flow through the wick. The larger the wick and the larger the pores, the faster the flow.

In the specific embodiment of the wick shown in FIG. 2, the heat treatment (as noted above) substantially closes off the pores on the side walls of the fiber bar. The major part of the flow therefore occurs through the ends 41 and 43 which have been cut or shaved to the tapered configurations shown and which permit access of the fluid to the open pore structure provided by the cutting away of the sidewalls.

Thus, as best shown by the block arrows 47 and 49 in FIG. 2, the fluid flows into the shaped end 43 and the fluid flows out of the shaped end 41.

Materials other than the above described polyester bar can be used for a wick material, but the specific polyester fiber bar (with the shaved ends as illustrated in FIG. 2) has been found quite effective in providing the desired rate of flow. With this structure the desired transfer of fluid from the wick 19 to the soil is achieved by capillary action, and, to a certain extent, by gravity flow of fluid through the interior of the wick 19.

In FIG. 2 portions of the sidewalls of the wick 19 have been broken away to indicate how the fluid can flow downwardly through the interior of the wick through the open pore structure.

The bottle 13, as best shown in FIG. 1, is preferably made of a transparent or translucent plastic material so that the upper level 51 of the fluid within the container can be seen.

One or more sides of the bottle 14 are also preferably formed with markings 53 to provide a measure of the amount of fluid which has been transferred from the bottle to the soil. In a specific embodiment of the invention the markings 53 indicate milliliters of fluid within the bottle.

It is believed that the operation of the nursery bottle 11 is apparent from the description of the structure as set out above; but, in summary, the bottle 13 is first filled or partially filled with a fluid (such as, for example, plain water or water with fertilizer or other nutrients) while the bottle is upright in the position shown in FIG. 3. The cap 15 is then screwed onto the neck 31. The plant nursery bottle 11 is inverted. The spike 17 is then pushed into the soil adjacent the plant 12 until the outer surface of the cap 25 engages the upper surface 27 of the soil to provide secure support for the inverted nursery bottle 11.

In the course of pushing the spike 17 down into the soil (until the cap 15 engages the soil) the tapered outer end 41 of the wick is pushed into the soil so that the wick 19 can transfer fluid into the soil by capillary action.

The wick permits the fluid to flow downwardly from the bottle into the soil at a rate which maintains sufficient moisture in the soil to keep the plant in a well cared for condition.

The rate at which fluid is transferred into the soil can be adjusted to a certain extent by loosening or tightening the cap 15 against the washer 35 and neck 31 of the bottle to let a greater or lesser amount of air enter into the interior of the bottle 13 as the level 51 of fluid drops.

There is probably also some flow of air into the interior of the bottle 11 through the wick 19, because the contents of the nursery bottle 13 can be transferred into the soil even when the cap 25 is tightly screwed down against the washer 35 and the neck 31.

The rate of fluid transfer from the bottle to the soil can also be varied by using a larger wick or by using a wick which has larger pores or by increasing the surface area of the shaved off ends 41 and 43 of the wick.

While we have illustrated and described the preferred embodiments of my invention, it is to be understood that these are capable of variation and modification and we therefore do not wish to be limited to the precise details set forth, but desire to avail ourselves of such changes and alterations as fall within the purview of the following claims.

We claim:

1. A container of the kind used for supplying water and/or nutrients directly into the soil adjacent a plant, said container comprising,
   bottle means for holding a supply of fluid to be applied into the soil adjacent a plant,
   bottle support and liquid applicator means for both supporting the bottle upright on the soil adjacent a plant and for also transferring liquid downwardly from the bottle into the soil,
   said bottle support and liquid applicator means comprising,
   a cap which encloses one end of the bottle,
   a single spike formed integral with and extending from the cap and insertable into the soil for supporting the bottle upright with the cap facing the soil, said spike having a rounded outer end and a tapered elongated shape for minimizing any possible damage to the root structure of the plant,
   said cap having an opening in the cap adjacent the spike means,
   wick means extending through said opening and having an inner end immersed in the liquid within the bottle and having an outer end insertable into the soil for transmitting fluid downwardly from the bottle into the soil at a rate which maintains sufficient moisture in the soil to keep the plant in a well cared for condition, said wick means being formed of a polyester fiber bar material which is stiff enough to permit the part of the wick means which extends outside of the cap to be pushed into the soil, said wick means having a porosity of a size which facilitates wicking of the fluid into the soil, and said outer end of the wick means being substantially shorter in length than the length of the spike so that the spike, rather than the wick means, provides the support for holding the bottle upright on the soil.

2. The invention defined in claim 1 wherein the wick means have a cut, tapered outer end for facilitating entry into the soil and for opening the pore structure of the tapered outer end, and wherein the side walls of the wick means extending upwardly from the tapered end have pores which are substantially closed off by a heat treatment step used in the course of manufacture of the wick means so that the fluid flows substantially only through the cut, tapered outer end and not through the side walls.

3. The invention defined in claim 1 wherein the wick means are generally square shaped in cross section with each side having a width between ⅛ inch and 3/16 inch.

4. The invention defined in claim 1 wherein the cap can be adjustably tightened against the bottle to regulate the amount of air which can enter the bottle at the juncture of the cap and the bottle so that the air pressure within the bottle can be regulated as liquid flows out of the bottle through the wick means to thereby exert a control on the rate at which fluid is transferred from the bottle to the soil.

5. The invention defined in claim 1 wherein the bottle has markings on the side to provide a measure of the amount of fluid which has been transferred from the bottle to the soil.

* * * * *